United States Patent

Klainos

[11] 3,935,580
[45] Jan. 27, 1976

[54] MULTI-IMAGE CAMERA
[75] Inventor: Michael Klainos, Roselle, Ill.
[73] Assignee: Identification Products Mfg. Co., Roselle, Ill.
[22] Filed: Aug. 1, 1974
[21] Appl. No.: 493,547

[52] U.S. Cl. ............................................. 354/121
[51] Int. Cl.² .......................................... G03B 1/00
[58] Field of Search .......................... 354/120, 121

[56] References Cited
UNITED STATES PATENTS
475,919   5/1892   Barril ................................. 354/121
3,598,035   8/1971   Haller ................................ 354/121

Primary Examiner—John M. Horan
Attorney, Agent, or Firm—Laff, Whitesel & Rockman

[57] ABSTRACT

A multi-image camera adapted to produce small photographs, such as those placed on personal identification cards, passes or the like. The camera takes exposures of up to four separate images either simultaneously or sequentially on self developing photosensitive paper. The camera is provided with a lens plate consisting of an apertured disc rotatable about a central axis, and a shutter which, when actuated, permits light to pass through one or more of the lens apertures and expose selected portions of the photosensitive paper. The lens position and shutter actuation are controlled by a single rotating lever arm assembly, and drive means.

9 Claims, 8 Drawing Figures

MULTI-IMAGE CAMERA

This invention relates to multi-image cameras, and more particularly, to multi-image cameras with a single rotating power source and lever arm assembly sequentially operating both the lens and shutter of the camera.

It has become quite common for individuals to be provided with identification cards containing their pictures. Many organizations, groups, benefit plans, and employers require members of the group or employees to have such identification cards.

With today's increasing photographic film and development costs, cameras have been developed which take a plurality of pictures on one film sheet. These cameras use an instant developing film i.e., Polaroid, and up to four pictures of either the same subject, or four separate subjects are exposed on the same film sheet. These pictures are immediately available and provide an easy and quick method of producing pictures for identification cards.

Heretofore, identification photo cameras have been big, bulky and expensive. Also, such cameras have required separate motors to control the lens position and shutter operation of the camera.

Accordingly, an object of this invention is to provide a multi-image camera which can take several pictures sequentially or simultaneously on a single sheet of photo-sensitive paper or film. More particularly, an object of the present invention is to provide a camera with only a single motor which can sequentially and automatically change lens positions and operate a shutter mechanism.

An additional object is to provide a multi-image camera which is efficient, fast and easy to use.

Yet another object is to provide a multi-image camera with a minimum of parts, particularly a four image camera having only a single power source and rotating lever arm assembly controlling both the lens position and the shutter operation.

An additional object of the present invention is to provide a multi-image camera with a common, sequential lens and shutter actuating mechanism whereby the shutter is not actuated until after the lens is properly positioned.

Yet another object of the present invention is to provide a lens and shutter operating system for a multiimage camera whereby a flash device is automatically actuated by the camera shutter.

A further object of the present invention is to provide a multi-image camera with means to indicate when a single sheet of photo-sensitive film has been completely exposed, and to prevent further exposure of the same sheet of film.

An additional object of the present invention is to provide a multi-image camera wherein the lens and shutter drive means is automatically de-energized following each exposure.

Yet another object of the present invention is to provide an automatic multi-image camera which is easy to handle, quick operating, efficient, and utilizes a minimum of parts. Additionally, the camera produces pictures that are quickly available, so that when a photographic error occurs, the photograph can be quickly re-taken.

In keeping with an aspect of this invention, this and other objects are accomplished by a camera primarily used to produce small photographs that are placed on identification cards, passes and the like. To this end, the lens and shutter systems of the disclosed embodiment of the camera are adapted to print four separate pictures on a single sheet of instant-developing film. The lens and shutter consist of apertured discs or plates which are rotatable about a central axis and mounted on a mouting plate integral with the camera. Switching devices are provided to control the automatic operation of the camera. An important feature of the novel camera is the single power means and co-axial actuating arms and levers which control all mechanical functions of the camera.

The nature of the preferred embodiment may be understood best from a study of the attached drawings in which.

Figure 1:
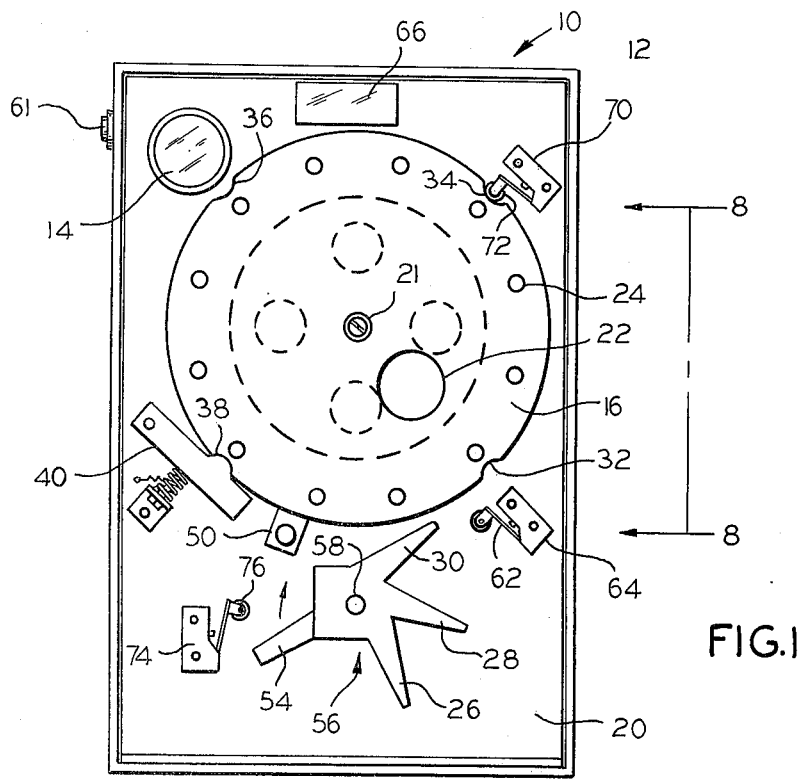
FIG. 1 is a front view of the operating mechanism of the inventive multi-image camera.
Figure 2:
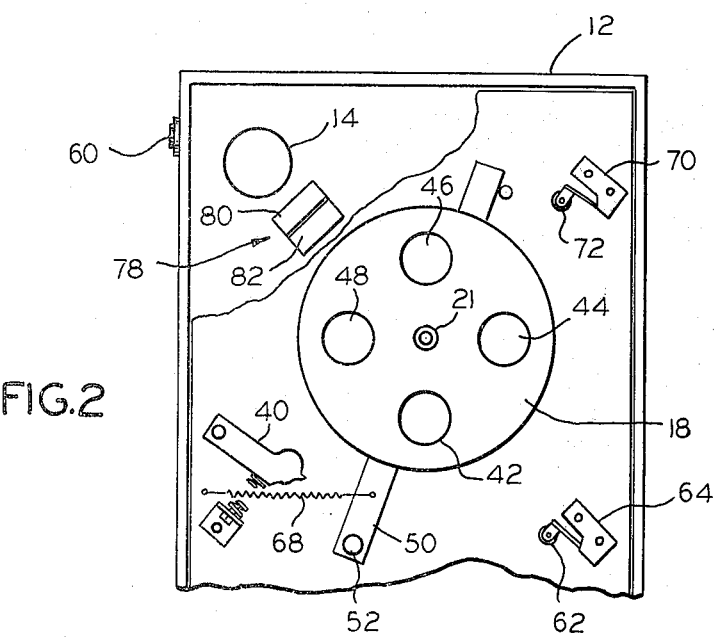
FIG. 2 is a partial front view of the inventive multi-image camera of FIG. 1, with the lens plate removed.
Figure 8:
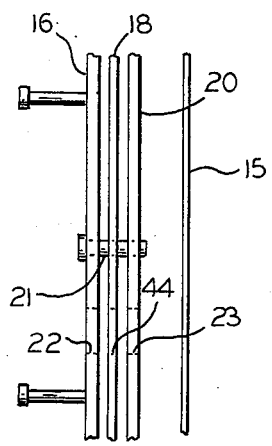
FIG. 8 is a partial cross-sectional and exaggerated view of the shutter and lens plate taken along line 8—8 in FIG. 1, showing the mounting plate aperture, shutter aperture, and lens plate aperture in alignment.

Referring now to the drawings FIGS. 1, 2, and 8, there is shown my inventive multi-image camera 10 mounted within a metal casing 12. An instant developing film adapter, i.e., Polaroid, is fixed to the rear of casing 12 with a camera focusing lens 14, protruding from the camera front. The embodiment of the disclosed camera 10 is adapted to take four pictures on a single sheet of film 15 lodged in the instant developing film adapter (FIG. 8) by means of the cooperation between a rotating lens plate 16 and a shutter plate 18 coaxially mounted on a mounting plate 20 about pivot pin 21. Mounting plate 20 is rigidly fixed to casing 12 and includes four equally spaced apertures 23 therein (FIG. 8) which, when open, permit light to expose a quadrant of film 15.

Lens plate 16 is disposed in front of the shutter plate 18 and in the disclosed embodiment has a single aperture 22 extending therethrough. To adopt this embodiment to enable exposure of more than one quadrant of film 15 at a time, two or more apertures 22 may be included in lens plate 16. The quadrant of film 15 to be exposed is selected by positioning lens plate 16 such that aperture 22 is in alignment with one of apertures 23 in mounting plate 20. Thus, when the shutter permits light to pass through lens aperture 22, only the quadrant of film 15 directly behind mounting plate aperture 23 is exposed.

Lens plate 16 includes rollpins 24 disposed equidistant around the periphery thereof, which coact with lens plate operating arms 26, 28, 30, forming part of lever arm assembly 56, to rotate the lens plate 16 about pin 21 as will be explained. The outer edge of the lens plate 16 comprises four detents or grooves 32, 34, 36, 38 which cooperate with spring biased detent latch 40 to hold lens plate 16 is proper position, whereby lens aperture 22 is in alignment adjacent one of mounting plate apertures 23.

A shutter plate 18 is provided behind lens plate 16, and includes four shutter apertures 42, 44, 46, 48 (FIG.

Figure 4:
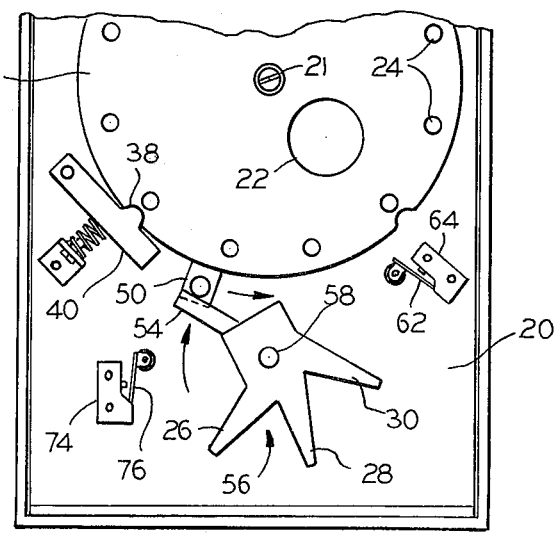

2). Each shutter aperture is adapted to selectively open the mounting plate aperture positioned behind lens aperture 22. Shutter plate 18 is mounted for rotation about pivot pin 21 and is adapted to rotate through a short arc between a first position (FIG. 4) whereby the apertures in the shutter plate are not over the apertures 23 in the mounting plate, to a second position (FIG. 5) whereby the shutter openings are directly over the mounting plate openings. It is apparent that by moving shutter plate 18 to the second position, light is permitted to pass to film 15 through the single mounting plate aperture 23 located behind lens plate aperture 22.

Referring to FIG. 2, a shutter movement arm 50 extends radially from a lower portion of the shutter plate 18. A shutter movement pin 52 is disposed on the end of the shutter movement arm 50, and is adapted to be actuated by shutter operating arm 54, as will be explained.

A primary feature of the present invention is the provision of a single power means to sequentially actuate both the lens movement mechanism and the shutter operating mechanism. To this end, a lever arm assembly 56 is disposed beneath lens plate 16 and shutter plate 18, and is fixed for rotation with the end of a shaft 58 which is driven by a motor (not shown) at approximately 25 R.P.M. The lens is actuated by lens operating cam means comprising three arms 26, 28, 30 extending from the lever arm assembly 56, and shutter operating cam means comprising a single arm 54 also extending from lever arm assembly 56. It is apparent that both the lens plate operating arms 26, 28, 30 and the shutter operating arm 54 are driven by a single power source or motor in one continuous, rotating motion. The relationship between the lens plate operating arm and the shutter operating arm is such that lens aperture 22 is positioned adjacent a mounting plate aperture 23 prior to actuation of the shutter.

Figure 3:
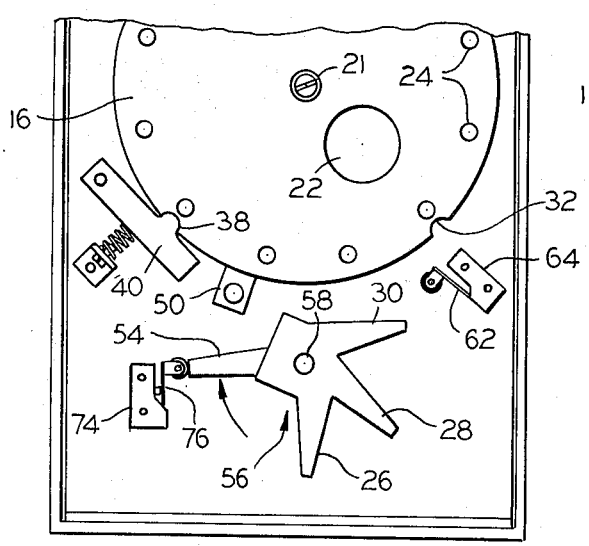
FIG. 3–6 show the lens and shutter actuating lever arm assembly and cooperating parts in various positions during sequential operation of the multi-image camera.

To operate the inventive multi-image camera, the lens, shutter and lever arm assembly parts are initially in the mode illustrated in FIG. 3. The operator pushes a switch 61 (FIGS. 3, 7) which starts the motor and rotates the lever arm assembly 56 in a clockwise direction. The shutter operating arm 54 first engages the shutter movement pin 52 on the shutter movement arm 50, and moves the latter to the right, shown in FIG. 4. This opens the lens behind the lens plate aperture 22, which has previously been positioned in alignment with one mounting plate aperture 23, and exposes the first quadrant of the film with the first picture.

Figure 5:
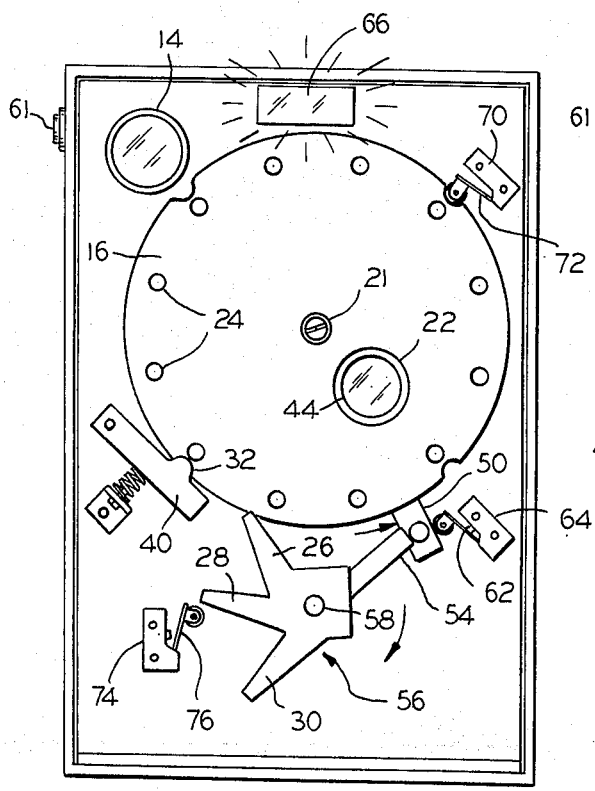

As shaft 58 continues to rotate, shutter arm 50 is moved to its furthest position to the right, and trips operating lever 62 of micro-switch 64 to actuate flash device 66 (FIG. 5). Further clockwise rotation of lever arm assembly 56 allows shutter operating arm 54 to disengage itself from the shutter arm 50, allowing the shutter 18 to return to its first position under the influence of shutter spring 68 (FIG. 2), thereby terminating the exposure. Exposure time is adjusted by varying the tension produced by the shutter spring 68.

Figure 6:
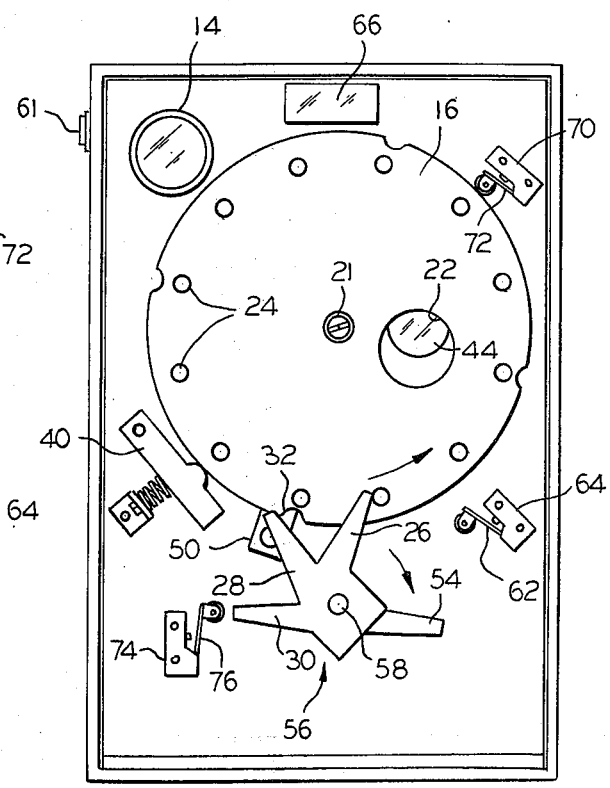

At this point, an exposure in the first quadrant of film 15 has been completed. As lever arm assembly 56 continues its clockwise rotation, lens plate operating arms 26, 28, 30 sequentially engage roll pins 24 on the periphery of lens plate 16 (FIG. 6), and force lens plate 16 to rotate in a counterclockwise direction until lens aperture 22 is aligned with the next adjacent aperture 23 in mounting plate 20. Shutter 18 is disposed in its first position (FIG. 1) covering the mounting plate aperture 23, and no exposure of film 15 takes place. Lens plate 16 continues to rotate about pin 21 until detent lever 40 engages one of detents 32, 34, 36, or 38 to hold lens plate 16 in proper position such that lens aperture 22 remains in alignment with a mounting plate aperture 23. A second microswitch 70 with operating lever arm 72 is closed when lens plate 16 is in its proper position. This is accomplished in the disclosed embodiment by locating lever arm 72, 180° from detent lever 40, whereby lever arm 72 falls into an opposing detent when lens plate 16 is positioned by detent lever 40. Thus, microswitch 70 functions as a safety switch to prevent an exposure from taking place before the lens aperture 22 is aligned with a mounting plate aperture 23.

As lever arm assembly 56 continues to rotate clockwise, shutter operating arm 54 trips lever arm 76 of microswitch 74 (FIG. 3), which intercepts the power source to the motor driving lever arm assembly 56. At this point, lever arm assembly 56 stops in the position shown in FIG. 3, and the device is ready to take the next picture. The motor is reactivated by operator-controlled switch 61, which overrides switch 74. The previously described cycle repeats, with the exposure taking place in the second quadrant, and lens plate 16 subsequently rotating to a position whereby lens plate aperture 22 is adjacent a third quadrant of the film 15.

A fourth microswitch 78 (FIG. 2) is provided and has two parts. One part 80 is a signal switch operating in response to one complete revolution of lens plate 16, which indicates by activating light 95 (FIG. 7) that all four pictures on a sheet of film have been exposed. Part two 82 of microswitch 78 is a locking switch to lock the motor after all four pictures are taken.

Figure 7:
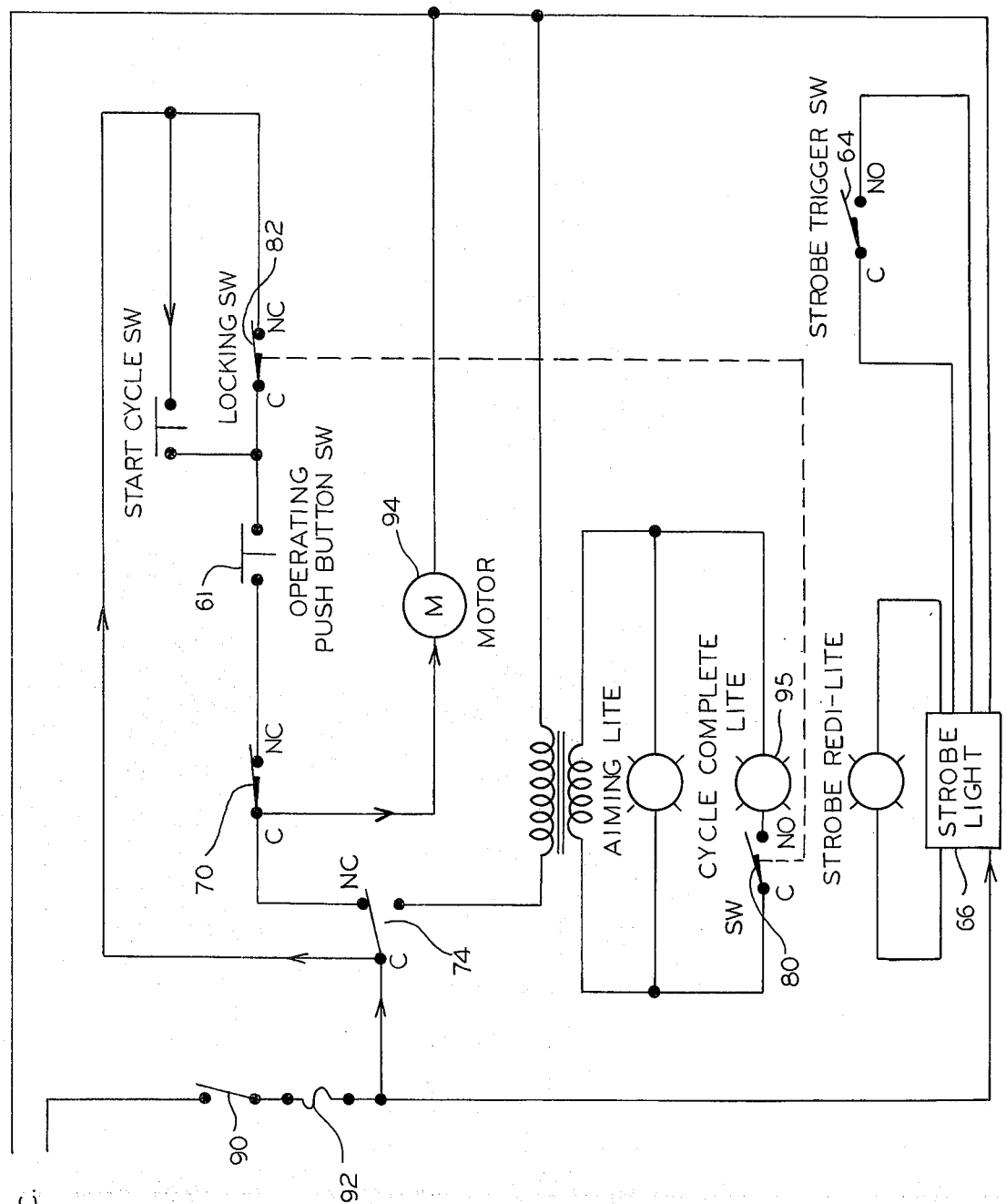
FIG. 7 is a diagram showing the switch and control circuitry of the disclosed multi-image camera.

A schematic of the electrical circuitry of the novel multi-image camera at rest is illustrated in FIG. 7. As seen in the schematic, electricity from a 115 volt source passes an on-off switch 90, a fuse 92 and microswitch 74 to approach start cycle switch 60. To activate the camera, the start cycle switch 60 and operating push button 61 are closed and electricity flows past microswitch 70, which is in its normal closed position, to activate the single power source or drive motor 94. Motor 94 when initially activated causes arm 54 to rotate in a clockwise direction and release lever 76 of switch 74, which now is in a normally closed position, and therefore there is no need to hold switches 60–61. At this time also the locking switch 82 is deactivated to its normally closed position. Motor 94, upon continued movement, also causes lever arm assembly 56 to revolve in a clockwise direction, thus moving the shutter movement arm 50 to close microswitch 64, which is normally open, thereby permitting electricity to pass to the strobe light 66, causing the strobe light to flash.

Microswitch 70, which is normally closed, acts as a safety switch; it is only when microswitch 70 is in a closed position that a picture can be taken. Microswitch 70 is maintained in a closed position when the microswitch operating lever arm 72 is in a proper detent, indicating that the lens aperture 22 is aligned with a mounting plate aperture 23.

Microswitches 80 and 82 operate in conjunction with each other. When microswitch 82 opens at the end of a four-exposure cycle, switch 80 closes, activating light 95. This conjunctive operation indicates that the cycle is complete (4 pictures taken on a single film), and that the camera is locked against further operation until the film with the four pictures taken is pulled out of the camera.

While the principles of the invention have been described above in connection with the specific apparatus and embodiments, it is to be understood that this description is made only by way of example and not as a limitation of the scope of the invention.

I claim:

1. A photographic camera for simultaneously or sequentially exposing a plurality of areas on a single sheet of photo-sensitive film;

said camera comprising a movable lens plate and a movable shutter plate mounted on one side of a mounting plate;

said mounting plate having a plurality of apertures extending therethrough;

said camera including means for holding said photo-sensitive film on the opposite side of said mounting plate;

said lens plate having at least one lens aperture therein, whereby said lens plate is movable to sequentially position each said lens aperture adjacent one of said mounting plate apertures;

said shutter plate including a plurality of apertures extending therethrough, whereby said shutter plate is movable from a first position whereby said mounting plate apertures are closed by said shutter plate, to a second position whereby said shutter plate apertures are in alignment with said mounting plate apertures;

first actuating means adapted to move said lens plate into and out of said position including first engagement means operatively connected to said lens plate;

second actuating means adapted to move said shutter plate from said first position to said second position;

power means for operating both said first and second actuating means, said power means comprising a single power source drivingly connected to a lever arm assembly to sequentially operate said first and second actuating means;

said lever arm assembly including lens operating cam means adapted to be operated by said first engagement means upon movement of said lever arm assembly by said power source to move said lens plate into and out of position to align said lens apetures with said mounting plate apertures;

whereby said power means is adapted to move said shutter plate to said second position when at least one of said lens plate apertures is in alignment with at least one of said mounting plate apertures to expose said photo-sensitive film.

2. The camera of claim 1 whereby said second actuating means includes:

second engagement means operatively connected to said shutter plate; and said lever arm assembly including shutter operating cam means adapted to be operated by said second engagement means upon movement of said lever arm assembly by said power source, whereby said shutter plate is moved from said first position to said second position.

3. The camera of claim 2 wherein said lens operating cam means and said shutter operating cam means are disposed in spaced relation relative to each other, whereby said shutter operating cam means does not engage said second engagement means until after said lens operating cam means has engaged said first engagement means and rotated said lens plate into position aligning said lens plate apertures with said mounting plate apertures.

4. The camera of claim 1 wherein:

said first engagement means includes a plurality of roller pins spaced around and extending laterally from the periphery of said lens plate;

said lens operating cam means including a plurality of operating arms adapted to engage said roller pins upon movement of said lever arm assembly to rotate said lens plate.

5. The camera of claim 2 wherein:

said second engagement means includes a shutter movement arm extending radially from said shutter plate; and said shutter operating cam means including a single shutter trup arm adapted to engage said shutter movement arm and actuate said shutter upon movement of said lever arm assembly.

6. A photographic camera for simultaneously or sequentially exposing a plurality of areas on a single sheet of photo-sensitive film;

said camera comprising a movable lens plate and a movable shutter plate mounted on one side of a mounting plate;

said mounting plate having a plurality of apertures extending therethrough;

said camera including means for holding said photo-sensitive film on the opposite side of said mounting plate;

said lens plate having at least one lens aperture therein, whereby said lens plate is movable adjacent one of said mounting plate apertures;

said shutter plate including a plurality of apertures extending therethrough, whereby said shutter plate is movable from a first position whereby said mounting plate apertures are closed by said shutter plate, to a second position whereby said shutter plate apertures are in alignment with said mounting plate apertures;

first actuating means adapted to move said lens plate into and out of said position;

second actuating means adapted to move said shutter plate from said first position to said second position;

power means for operating both said first and second actuating means, said power means adapted to move said shutter plate to said second position when at least one of said lens plate apertures is in alignment with at least one of said mounting plate apertures to expose said photo-sensitive film;

a flash light source operatively connected to said camera;

switch means associated with said flash light source to activate said light;

said switch means adapted to be activated by said second actuating means when said shutter plate is moved to said second position.

7. A photographic camera for simultaneously or sequentially exposing a plurality of areas on a single sheet of photo-sensitive film;

said camera comprising a movable lens plate and a movable shutter plate mounted on one side of a mounting plate;

said mounting plate having a plurality of apertures extending therethrough;

said camera including means for holding said photo-sensitive film on the opposite side of said mounting plate;

said lens plate having at least one lens aperture therein, whereby said lens plate is movable to sequentially position each said lens aperture adjacent one of said mounting plate apertures;

said shutter plate including a plurality of apertures extending therethrough, whereby said shutter plate is movable from a first position whereby said mounting plate apertures are closed by said shutter plate, to a second position whereby said shutter plate apertures are in alignment with said mounting plate apertures;

first actuating means adapted to move said lens plate into and out of said position;

second actuating means adapted to move said shutter plate from said first position to said second position;

power means for operating both said first and second actuating means, said power means adapted to move said shutter plate to said second position when at least one of said lens plate apertures is in alignment with at least one of said mounting plate apertures to expose said photo-sensitive film;

a plurality of detent means disposed around the circumference of said lens plate; and pressure biases detent latch means adapted to fall into one of said detent means when said lens plate is properly positioned to maintain said lens aperture in alignment with one of said mounting plate apertures.

8. A photographic camera for simultaneously or sequentially exposing a plurality of areas on a single sheet of photo-sensitive film;

said camera comprising a movable lens plate and a movable shutter plate mounted on one side of a mounting plate;

said mounting plate having a plurality of apertures extending therethrough;

said camera including means for holding said photo-sensitive film on the opposite side of said mounting plate;

said lens plate having at least one lens aperture therein, whereby said lens plate is movable to sequentially position each said lens aperture adjacent one of said mounting plate apertures;

said shutter plate including a plurality of apertures extending therethrough, whereby said shutter plate is movable from a first position whereby said mounting plate apertures are closed by said shutter plate, to a second position whereby said shutter plate apertures are in alignment with said mounting plate apertures;

first actuating means adapted to move said lens plate into and out of said position;

second actuating means adapted to move said shutter plate from said first position to said second position;

power means for operating both said first and second actuating means, said power means comprising a single power source driving connected to a lever arm assembly to sequentially operate both said first and second actuating means and adapted to move said shutter plate to said second position when at least one of said lens plate apertures is in alignment with at least one of said mounting plate apertures to expose said photo-sensitive film.

said power means further including sensing means operatively connected to said power source to interrupt the operation of said power source when activated;

said sensing means including lever arm means;

said second actuating means adapted to contact said lever arm means and activate said sensing means subsequent to movement of said lens plate into its position; and override means adapted when activated to commence operation of said power source while said sensing means is activated.

9. A photographic camera for simultaneously or sequentially exposing a plurality of areas on a single sheet of photo-sensitive film;

said camera comprising a movable lens plate and a movable shutter plate mounted on one side of a mounting plate;

said mounting plate having a plurality of apertures extending therethrough;

said camera including means for holding said photo-sensitive film on the opposite side of said mounting plate;

said lens plate having at least one lens aperture therein, whereby said lens plate is movable to sequentially position each said lens aperture adjacent one of said mounting plate apertures;

said shutter plate including a plurality of apertures extending therethrough, whereby said shutter plate is movable from a first position whereby said mounting plate apertures are closed by said shutter plate, to a second position whereby said shutter plate apertures are in alignment with said mounting plate apertures;

first actuating means adapted to move said lens plate into and out of said position;

second actuating means adapted to move said shutter plate from said first position to said second position;

power means for operating both said first and second actuating means, said power means adapted to move said shutter plate to said second position when at least one of said lens plate apertures is in alignment with at least one of said mounting plate apertures to expose said photo-sensitive film;

control means operatively connected to said power means and responsive to one revolution of said lens plate to simultaneously indicate that said film has been completely exposed, and to prevent further operation of said power source until said film has been replaced in said camera;

said control means including first switch means adapted to be closed when said lens plate completes one revolution whereby a light indicating a complete exposure cycle is activated, and second switch means operating in conjunction with said first switch means whereby said second switch means is opened when said first switch means is closed to interrupt the operation of said power means until said film has been replaced in said camera.

* * * * *